United States Patent [19]
La Branche et al.

[11] 3,923,952
[45] Dec. 2, 1975

[54] METHOD FOR SHAPING A NORMALLY RIGID PLASTIC PIPE

[75] Inventors: Harvey W. La Branche, Olympia; John C. Dimmer, Tacoma, both of Wash.

[73] Assignee: Western Plastics Corporation, Tacoma, Wash.

[22] Filed: May 23, 1973

[21] Appl. No.: 363,081

[52] U.S. Cl. ............... 264/313; 264/296; 264/322; 425/393
[51] Int. Cl.² .......................................... B29C 1/12
[58] Field of Search ........... 264/295, 296, 313, 322; 425/392, 393

[56] References Cited
UNITED STATES PATENTS

| | | | |
|---|---|---|---|
| 3,432,887 | 3/1969 | Poux et al. | 425/393 |
| 3,500,513 | 3/1970 | Stanley | 264/313 |
| 3,823,216 | 7/1974 | Petzetakis | 264/313 |

FOREIGN PATENTS OR APPLICATIONS

| | | | |
|---|---|---|---|
| 1,372,385 | 8/1964 | France | 264/313 |

Primary Examiner—Robert F. White
Assistant Examiner—T. E. Balhoff
Attorney, Agent, or Firm—Eugene D. Farley

[57] ABSTRACT

A normally rigid plastic pipe is shaped by softening a selected zone of the pipe, inserting into the softened zone a resiliently deformable mandrel and pressing axially on opposite sides of the mandrel. This expands the mandrel radially into frictional engagement with the softened pipe zone. Contemporaneously the mandrel is shortened axially, thereby correspondingly expanding radially and shortening axially the softened portion of the pipe while proportionately thickening its side walls.

8 Claims, 3 Drawing Figures

METHOD FOR SHAPING A NORMALLY RIGID PLASTIC PIPE

This invention relates to method and apparatus for shaping a normally rigid plastic pipe or tube. It pertains particularly to a method of forming a bell or socket on the end of a synthetic thermoplastic pipe such as is employed in the transmission of fluids, as an electrical conduit and the like.

Pipes made of heat softenable synthetic plastics are well known and widely used for many purposes. They customarily are supplied in standard lengths and diameters. To enable joining successive lengths end to end it is conventional practice to heat-soften one end of each length and then form it with a mandrel to an enlarged diameter. This forms an integral bell or socket dimensioned to receive the unaltered end of an adjacent pipe length in telescoping relationship. The telescoped ends then are sealed with cement or by means of O-rings to form the finished joint.

Where an integral bell is formed in the manner described, there obviously is a thinning of the wall in the formed zone resulting from stretching it to an increased diameter. This thinning is inconsequential where the pipe is to be used at ambient pressures, as is the case where it is used for electrical duct work, or as drain pipe.

However, if the pipe is intended for use in situations in which it is subjected to pressure, as in pressurized water systems, thinning of the pipe at the bell is unacceptable because the pipe strength is reduced correspondingly. In such situations it is required that the wall thickness of the bell be at least as great as the wall thickness of the balance of the pipe.

Various expedients heretofore have been employed to provide pipe having a bell of adequate wall thickness.

In one, a molded bell fitting of the desired wall thickness is lapped over the end of a length of pipe and cemented thereto. This provides the desired bell wall thickness and the exterior detailing of the bell is sharp and workmanlike. However, the cemented-on bell is less reliable than an integral bell because cementing the molded bell onto the pipe is difficult, particularly with the larger sizes, and the workmanship involved in making the joint may be unreliable. Because of the added labor, the cost is more. Because of the necessity of providing a multiplicity of expensive injection molds, one for each bell size, the number of sizes commercially available is likely to be restricted to the most popular sizes only.

A second procedure for manufacturing plastic pipe with bells of adequate wall thickness is set forth in U.S. Pat. No. 3,264,383.

In accordance with this method, plastic pipe is extruded with spaced segments of increased wall thickness. The pipe is cut at the thick-walled areas which then form the pipe ends. These ends then are enlarged over a mandrel to the desired bell shape. The increased thickness of the original pipe end thus compensates for the thinning occurring whhen it is forced over a mandrel. This method obviously requires complex and expensive machinery to manufacture the extruded pipe with spaced segments of increased thickness.

Still another procedure for achieving the desired result is to cement an external collar of plastic over the ends of the pipe which are to be mandrel-belled. This procedure is workable, but requires careful control of collar dimensions and placement with resultant increased costs.

It accordingly is the object of the present invention to provide method and apparatus for shaping a normally rigid plastic pipe or tube, specifically the end of a thermoplastic pipe, which overcomes the foregoing problems and provides an integral bell having a wall thickness which is as great as or greater than the thickness of the balance of the pipe, without the necessity for manufacturing the pipe in the first instance with zones of increased thickness, and without the necessity of using an external thickening collar. The hereindescribed procedure has additional advantages in that it:

Provides for molding detail such as trademarks, instructions, etc., into the exterior of the bell.

Provides for a molded-in re-entrant pocket suitable for the reception of a sealing O-ring.

Compensates for manufacturing variations in wall thickness.

Requires only inexpensive equipment so that tooling costs are low.

Makes possible the provision of a wide range of pipe sizes at practical cost.

Makes possible molding chamfers in the bell margin.

Can be automated.

The manner in which the foregoing and other objects of this invention are accomplished will be apparent from the accompanying specification and claims considered together with the drawings wherein:

In its broad aspect, the hereindescribed method of shaping a normally rigid plastic pipe or tube comprises first softening a selected zone of the pipe, usually its end. A resiliently deformable mandrel is inserted into the softened zone. The mandrel is compressed axially and simultaneously on its opposite sides by an amount predetermined to expand it radially into frictional engagement with the softened pipe zone.

While the mandrel is in such engagement, it is shortened by compressing it axially. This correspondingly expands the softened pipe radially and shortens it axially. Because of the resulting frictional drag, the side walls of the tube in the softened zone are thickened by an amount proportional to its shortening.

As additional features, there may be provided a rigid zone immediately adjacent the softened zone of the pipe and the mandrel may be dimensioned to engage both zones. Upon expansion of the mandrel, it releasably locks itself to the rigid zone of the pipe. This creates a positive drive in the direction of shortening the softened zone and thickening its walls.

Also, an abutment may be provided against which the end face of the softened pipe zone bears as it is shortened. This further increases the positive action of shortening the softened zone and thickening the walls.

Still further, the softened zone of the pipe may be enclosed in a die placed in forming relation to it so that as it is expanded it is shaped to a desired contour, for example a socket or bell designed for use in a pipe joint.

Considering the foregoing in greater detail and with particular reference to the drawings:

As stated above, the method of the invention is applicable particularly to the shaping of pipe or tubing made of thermoplastic synthetic materials and used in such applications as the transmission of fluids, both pressured and unpressured, in encasing electrical duct work, etc. Such pipe is commonly manufactured by extruding softened plastic material through a suitable die, cooling the resultant extruded pipe, and cutting it in lengths. The presently described apparatus may be employed in conjunction with such a procedure, the ends of the pipe lengths being heated until soft and then introduced into the apparatus for shaping them into the desired bell or socket.

Figure 1:
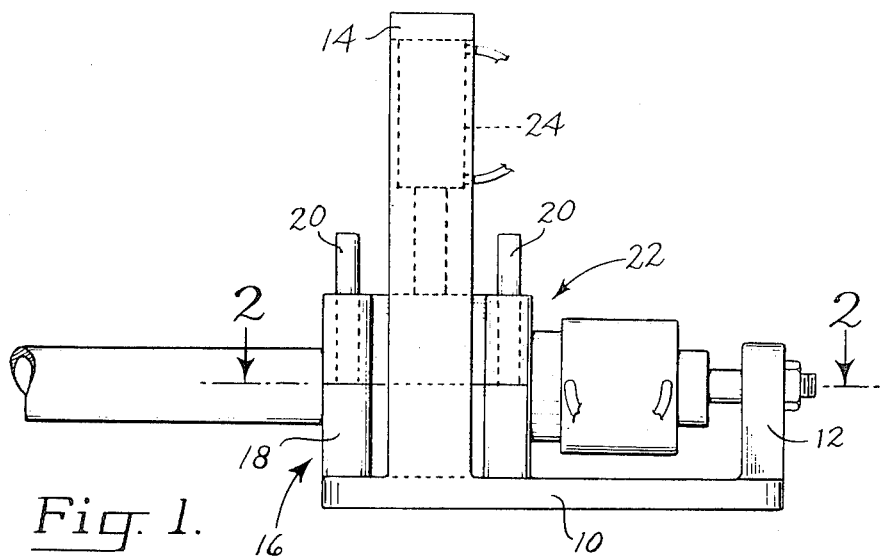
FIG. 1 is a view in side elevation of apparatus suitable for use in accomplishing the hereindescribed method of shaping plastic pipe or tube.

The apparatus employed for this purpose is indicated generally in FIG. 1.

It comprises a base 10 having at its downstream end a substantial standard 12. At its upstream end the base supports a standard 14 in the shape of an inverted U.

The latter standard mounts a separable die 16. The lower half 18 of the die rests on base 10 between the two legs of standard 14. It mounts a plurality of upwardly extending guide rods 20.

The upper half 22 of the die is provided with openings which serve as slides and receive guide rods 20, thereby mounting the upper die half for vertical reciprocation between open and closed positions.

The drive attached to the upper die part comprises a double acting, fluid operated cylinder 24. The base of the cylinder is supported on the cross piece of standard 14. The piston rod of the cylinder is integral with the upper segment of the die. Reciprocation of the cylinder accordingly reciprocates the upper segment of the die between open and closed positions.

Figure 2:
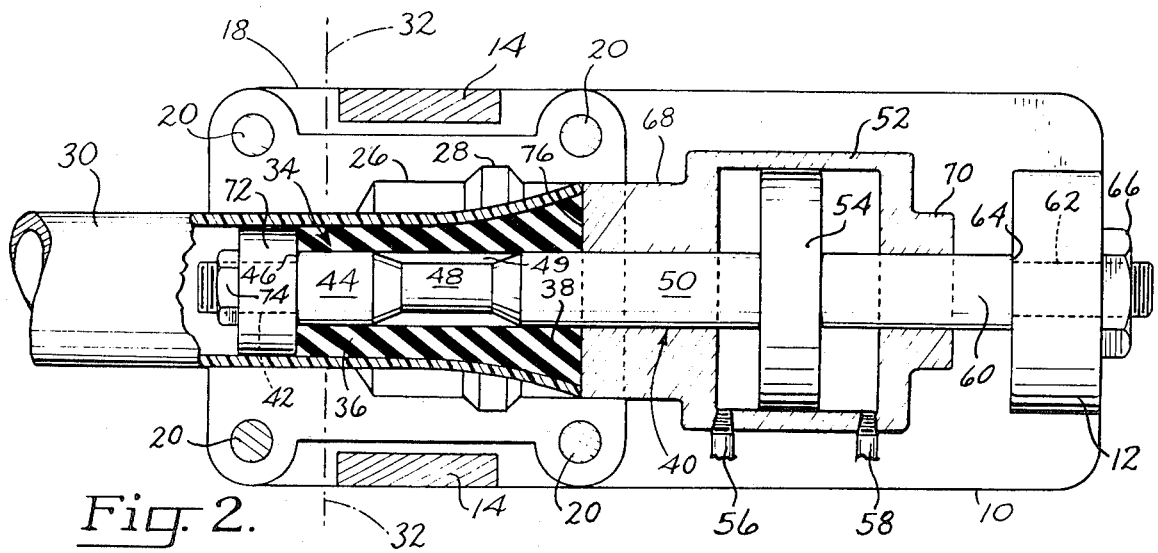
FIGS. 2 and 3 are longitudinal, sectional views taken along line 2—2 of FIG. 1, FIG. 2 illustrating the position of the apparatus at the start of the shaping operation and FIG. 3 illustrating the position of the apparatus at the conclusion thereof.

The interior of a die formed by mating segments 16, 22 is shaped to the desired contour. As shown particularly in FIG. 2, the die cavity 26 may be formed in the shape of a bell or socket of the desired diameter. Preferably it incorporates a re-entrant section 28 which in the molded product forms an annular recess dimensioned to receive a sealing O-ring.

The die is open at the infeed end and is dimensioned to receive the end of a length of plastic pipe 30. This has been heated in a preliminary step to form a softened zone to the right of dashed reference line 32 FIG. 2, merging with a rigid zone to the left of the reference line.

Mandrel means are provided for insertion into the softened zone of the tube and expanding it to the dimensions of the die.

The mandrel basically comprises a hollow tube indicated generally at 34 and made of a resiliently deformable material. Although a number of such materials are suitable for the indicated purpose, a preferred one comprises a natural or synthetic rubber, especially the synthetic rubber commonly known as silicone rubber. Such rubbers have softening points sufficiently elevated to remain unmelted at the softening temperature of the plastic tube, i.e., at a temperature of about 400°F. Also, they may be precisely shaped, are resiliently deformable, and when the deforming pressure has been removed return quickly and precisely to their original contour.

Mandrel 34 preferably is formed in an upstream segment 36 contoured as a hollow cylinder and a downstream segment 38 having an outward taper or flare. It is mounted on a segmented shaft or piston rod indicated generally at 40.

At the outer end of the piston rod there is a reduced threaded segment 42. Immediately adjacent is a segment 44 of normal diameter. At the junction between these two segments there is a shoulder 46.

Next to segment 44 there is a segment 48 of reduced diameter. This forms a cavity 49 into which part of the substance of the mandrel is forced during its compression. It locates and determines a relatively thick zone in the pipe wall, as will appear hereinafter.

Immediately adjacent segment 48 of the piston rod there is a segment 50 of normal diameter. This enters a cylinder 52 and is integral with a stationary piston 54, housed in the cylinder. Fluid under pressure is introduced alternately into cylinder 52 on opposite sides of piston 54 through conduits 56, 58 in the usual manner.

Also integral with piston 54 is a piston rod segment 60. This terminates in a threaded segment 62 of reduced diameter which forms with segment 60 a shoulder 64. The threaded segment is received in a transverse opening in standard 12 and mounts a nut 66 by means of which the position of the piston rod may be adjusted. Shoulder 64 bears against the inner face of standard 12 and, with nut 66 locks the piston rod, and piston, against longitudinal motion.

The piston rod thus is slidably received in a forward extension 68 of cylinder 52 and a rearward extension 70 thereof. It mounts at its outer end an abutment or stop 72. This member of the assembly is in the form of a ring having an outer diameter equal to or slightly less than the inner diameter of pipe 30. It is maintained releasably in position by means of a nut 74. Its inner face bears against shoulder 46 and also against the outer face of mandrel 34.

Cooperating with abutment 72 is an upstream abutment 76. This comprises the outer face of case extension 68. It bears against the inner end of mandrel 34.

OPERATION

In the operation of the apparatus, the outer end of pipe 30 is heat-softened to a plastic condition. This is the end to the right of reference line 32 of FIG. 2. The portion of the tube immediately adjacent to the left of the reference line is cool and still rigid.

With the die in its open position, the end of the pipe is inserted longitudinally into the die opening until the end face of the pipe abuts against abutment surface 76. During this insertion, the softened end of the pipe is guided and flared outwardly into a contour corresponding to the outwardly tapered or flared contour of the inner end 38 of mandrel 34. This insures that the end of the pipe will be distended to the full width of the final bell and not hang up by frictional engagement with abutment surface 76 during the forming operation.

Figure 3:
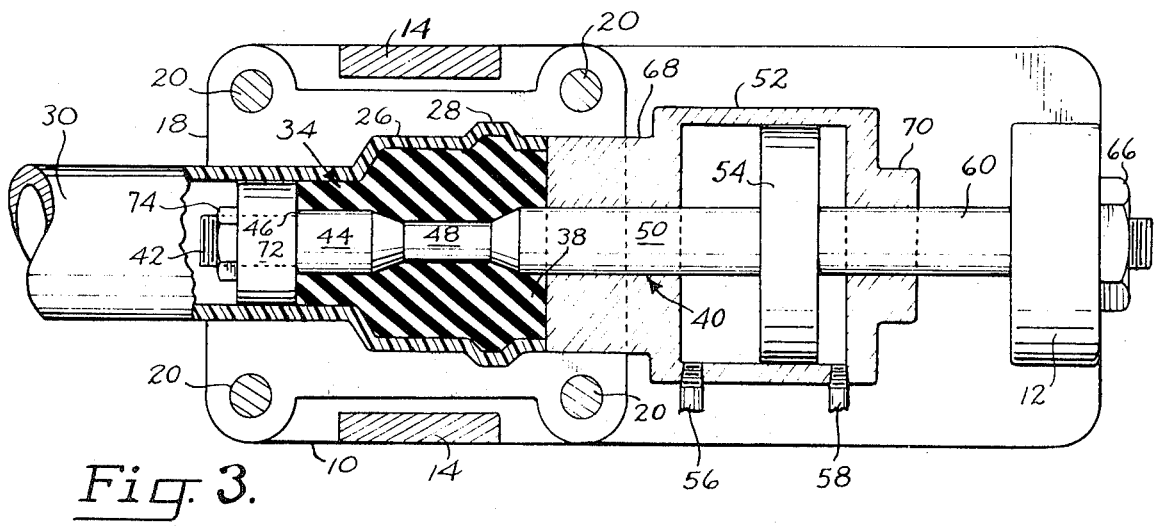

The die then is closed. Fluid under pressure is admitted into the operating cylinder through conduit 56 ahead of piston 54. Since the piston is fixed, the result is to slide case 52 forwardly from its FIG. 2 to its FIG. 3 position. This results in the compression of mandrel 34 between abutment ring 72 and abutment surface 76.

During such compression, the mandrel expands radially while at the same time shortening axially. Frictional engagement of the outer surface of the mandrel with the interior surface of the softened plastic pipe creates a frictional drag. This causes a thickening of the pipe wall at the same time that the pipe is being distended radially and shortened axially until it conforms to the inner contour of the die.

This effect is augmented by reason of the fact that piston rod segment 44 penetrates into the cool rigid zone of the tube, i.e., that to the left of reference line 32. Expansion of the mandrel in this zone positively but releasably locks the mandrel to the inner wall of the rigid portion of the tube and creates a positive drive.

The thickening effect is augmented further by abutment of the inner face of the tube against abutment surface 76.

The softened portion of the pipe thus is locked at both upstream and downstream ends and is forced into a die cavity of known and predetermined capacity. The result is that a bell or socket is formed on the end of the pipe. After cooling of the bell to rigidifying temperature, the piston is returned to its FIG. 2 position. This relaxes the mandrel. The die then is opened and the pipe removed.

The resulting bell is of precise dimensions and reproducible from pipe length to pipe length even though there may be some irregularity in wall thickness of the pipe as originally extruded. The following considerations prevail:

The initial forming conditions provide a mandrel volume $V_1$, and a remaining cavity volume $V_2$. When the plastic pipe with volume $V_3$ is introduced into the cavity, the remaining unfilled volume will be $(V_2 - V_3)$.

The distance that the cylinder 52 will move during the forming process is defined by the ratio of initial mandrel and plastic pipe volume to the total volume of mandrel, plastic pipe, and cavity. It will move until the cavity space is completely filled.

Thus if the plastic pipe is thin, then plastic pipe volume $V_3$ is reduced, and the remaining cavity volume $(V_2 - V_3)$ is increased. Cylinder 52 must move farther to fill the cavity. This farther movement will result in greater relative thickening of the pipe wall. Conversely, if the pipe is thick, then cylinder 52 does not move as far, so that relative thickening of the pipe is less.

The system thus compensates for variations in wall thickness to a degree dictated by the dimensions of the bell pocket, and the diameter of shaft 40.

Further, because of the shortening of the pipe through the frictional drag effect, the wall thickness of the bell portion of the product may assume any desired value, normally at least the thickness of the balance of the pipe.

Still further, thicker sections of pipe wall can be produced in selected pipe zones by the simple expedient of providing corresponding relieved segments 48 in shaft 40. This is apparent from the following considerations:

As cylinder 52 moves forward, cavity 26 will fill. The amount of motion of cylinder 52 required to fill the cavity will define the wall thickness of the pipe at this point in time. If shaft 40 is selectively reduced in diameter, as at 48, then further motion of cylinder 52 will be required to fill the cavity. The mandrel and plastic pipe in the same axial zone will be shortened further, but the mandrel and plastic pipe in the unrelieved zones at 44, 50 will not shorten. Thus a selectively thicker section of pipe wall can be produced, in zones defined by relieved areas 48.

Accordingly, by the practice of the invention, it is possible in a single operation to provide on the end of a plastic pipe an integral bell or socket having a wall of any desired thickness and an annular groove dimensioned to receive a sealing member such as an O-ring. Of particular significance is the fact that the thickened wall can be created in any selected zone or area of the pipe.

This result is achieved, furthermore, without the necessity of using costly injection molds for the separate manufacture of bells of various sizes, withoug the necessity of forming the pipe originally with thickened sections at spaced intervals, without the necessity of adding reinforcing rings to the bell area, and without delay of production schedules.

Having thus described our invention in preferred embodiments, we claim:

1. The method of shaping a normally rigid plastic tube comprising:
   a. softening a selected zone of the tube adjacent a rigid zone,
   b. surrounding the softened zone with a die,
   c. inserting a resiliently deformable mandrel into the softened zone and the adjacent rigid zone,
   d. pressing axially and simultaneously on the opposite sides of the mandrel sufficiently to expand the mandrel radially into frictional engagement with the softened zone and with the adjacent rigid zone and, while in such engagement to shorten the mandrel axially to radially expand the softened zone into forming contact with the die, thereby correspondingly expanding radially and shortening axially said softened zone while proportionately thickening its side walls,
   e. rigidifying said softened zone while in its dimension-altered condition, and
   f. relaxing the mandrel and extracting it from the tube.

2. The method of claim 1 wherein the plastic tube comprises a thermoplastic tube and wherein the selected zone of the tube is softened by heating it to a predetermined temperature.

3. The method of claim 1 wherein the selected zone of the tube comprises a tube end and the resultant shaped plastic tube product comprises a plastic tube having a belled end.

4. The method of claim 1, including the step of pressing against the end face of the tube remote from the rigid zone, contemporaneously with pressing axially on the opposite sides of the mandrel, to urge said end face toward said rigid zone to augment the axial shortening of said softened zone.

5. The method of claim 4 wherein the inner end of the mandrel is outwardly flared and including the step of outwardly flaring the softened end zone of the tube upon insertion of the mandrel into the same.

6. The method of claim 4 wherein the die is provided with an annular recess and including the step of expanding the softened tube into the annular recess to form an annular groove in the tube.

7. The method of claim 1 wherein the mandrel is in the form of a hollow cylinder and includes a shaft mounting the cylinder, the shaft having in a predetermined location a relieved segment of reduced diameter which in the uncompressed condition of the mandrel is spaced from the mandrel, thereby forming a cavity, and including the step of pressing on the mandrel sufficiently to expand it radially into the cavity, thereby selectively shortening that part of the mandrel which lies opposite the relieved shaft segment, and correspondingly thickening that part of the tube wall engaged by said mandrel part.

8. The method of shaping a normally rigid plastic tube comprising:

a. softening an end zone of the tube immediately adjacent a rigid zone,
b. surrounding the softened end zone with a die,
c. inserting into the softened end zone and the adjacent rigid zone a resiliently deformable mandrel,
d. pressing axially and simultaneously on the opposite sides of the mandrel by an amount predetermined to expand the mandrel radially into frictional engagement with the softened tube end zone and with the adjacent rigid zone and while in such engagement to shorten the mandrel axially,
e. the mandrel portion in contact witht the said immediately adjacent rigid zone releasably gripping the same and the mandrel portion in contact with the softened end zone expanding the same radially into forming contact with the die, thereby correspondingly expanding radially and shortening axially the softened tube zone while proportionately thickening its side wall,
f. while pressing on the opposite sides of the mandrel abutting the end face of the softened end zone against an abutment,
g. rigidifying said softened end zone while in its dimensioned-altered condition and
h. relaxing the mandrel and removing it from the tube.

* * * * *